United States Patent
Kawada et al.

(10) Patent No.: US 12,349,640 B2
(45) Date of Patent: Jul. 8, 2025

(54) PLANTING CONTAINER UNIT AND GREENING METHOD USING SAME

(71) Applicant: KAWADA INDUSTRIES, INC., Tokyo (JP)

(72) Inventors: Shinichi Kawada, Tokyo (JP); Yasujiro Katsuyama, Kawaguchi (JP)

(73) Assignee: KAWADA INDUSTRIES, INC, Tokyo (JP)

( * ) Notice: Subject to any disclaimer, the term of this patent is extended or adjusted under 35 U.S.C. 154(b) by 95 days.

(21) Appl. No.: 18/019,860

(22) PCT Filed: Aug. 6, 2020

(86) PCT No.: PCT/JP2020/030238
§ 371 (c)(1),
(2) Date: Feb. 6, 2023

(87) PCT Pub. No.: WO2022/029964
PCT Pub. Date: Feb. 10, 2022

(65) Prior Publication Data
US 2023/0270051 A1     Aug. 31, 2023

(30) Foreign Application Priority Data
Aug. 5, 2020 (JP) ................ 2020-133040

(51) Int. Cl.
*A01G 9/02* (2018.01)
(52) U.S. Cl.
CPC ............ *A01G 9/025* (2013.01); *A01G 9/023* (2013.01)
(58) Field of Classification Search
CPC ............... A01G 9/025; A01G 9/023; A01G 2009/003; A01G 27/02
See application file for complete search history.

(56) References Cited

U.S. PATENT DOCUMENTS

2010/0146855 A1\* 6/2010 Ma .................. A01G 9/025
  47/82
2011/0192084 A1\* 8/2011 MacKenzie ............ A01G 9/025
  47/65.5
(Continued)

FOREIGN PATENT DOCUMENTS

CN   110140552 A  \*  8/2019
CN   111052950 A  \*  4/2020
(Continued)

OTHER PUBLICATIONS

Oct. 20, 2020 International Search Report issued in International Patent Application No. PCT/JP2020/030238.

*Primary Examiner* — Magdalena Topolski
*Assistant Examiner* — Alanna K Peterson
(74) *Attorney, Agent, or Firm* — Oliff PLC

(57) ABSTRACT

A container unit for greening of wall surface and greening method using container unit. The planting container unit has an outer container having an upper-surface and a front-surface opening, an inner container that can be inserted into the front-surface opening of the outer container, and a fixing plate where the inner container is fixed to the outer container. The inner container is capable of housing a planting base, incudes a front-surface opening where a plant body part of the pot plant can be exposed to an outside, and includes an upper-surface opening for housing the planting base and the pot plant. The inner container has, on a front surface having the front-surface opening, a front-surface flange that engages with a wall of the outer container around the front-surface opening. The planting container unit is configured such that the inner container is removably housed inside the outer container.

17 Claims, 14 Drawing Sheets

(56) References Cited

U.S. PATENT DOCUMENTS

2012/0272573 A1 11/2012 Hashimoto
2020/0196534 A1* 6/2020 Spiro ..................... A01G 9/023

FOREIGN PATENT DOCUMENTS

| JP | 2005-333976 A | 12/2005 | |
|---|---|---|---|
| JP | 2009-171953 A | 8/2009 | |
| JP | 2011-101607 A | 5/2011 | |
| JP | 3215545 U | 3/2018 | |
| KR | 10-2012-0007207 A | 1/2012 | |
| KR | 20-2013-0007485 U | 12/2013 | |
| KR | 102115913 B1 * | 5/2020 | |
| TW | 201141370 A * | 12/2011 | |
| WO | WO-2009084310 A1 * | 7/2009 | ........... A01G 27/005 |
| WO | 2015/167324 A1 | 11/2015 | |
| WO | WO-2016166601 A1 * | 10/2016 | |
| WO | 2019/194752 A1 | 10/2019 | |

* cited by examiner

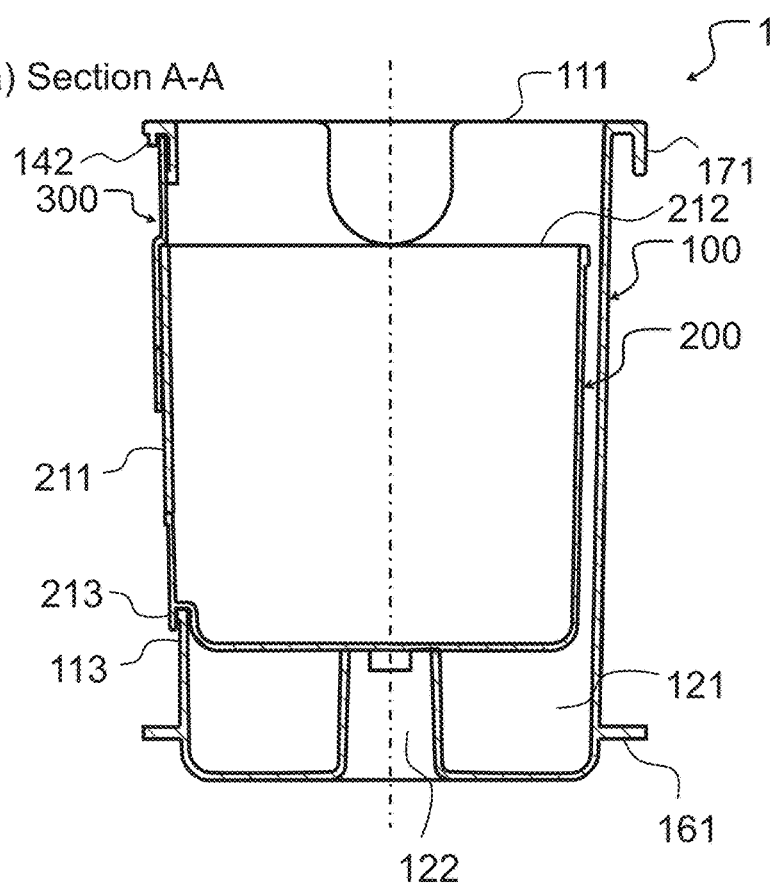
Fig.6(a) Section A-A
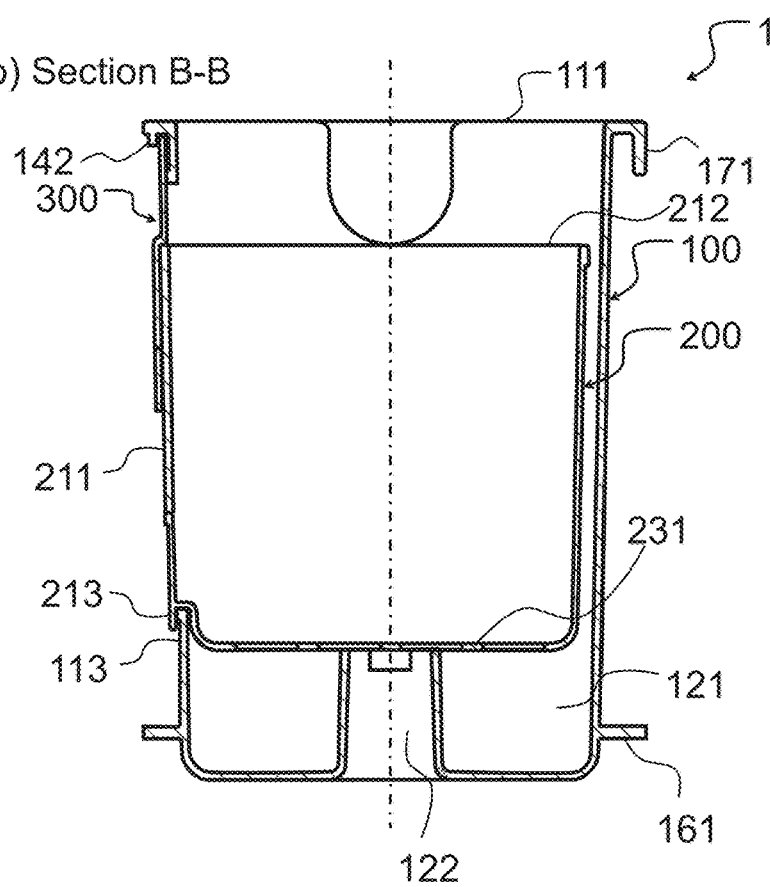
Fig.6(b) Section B-B

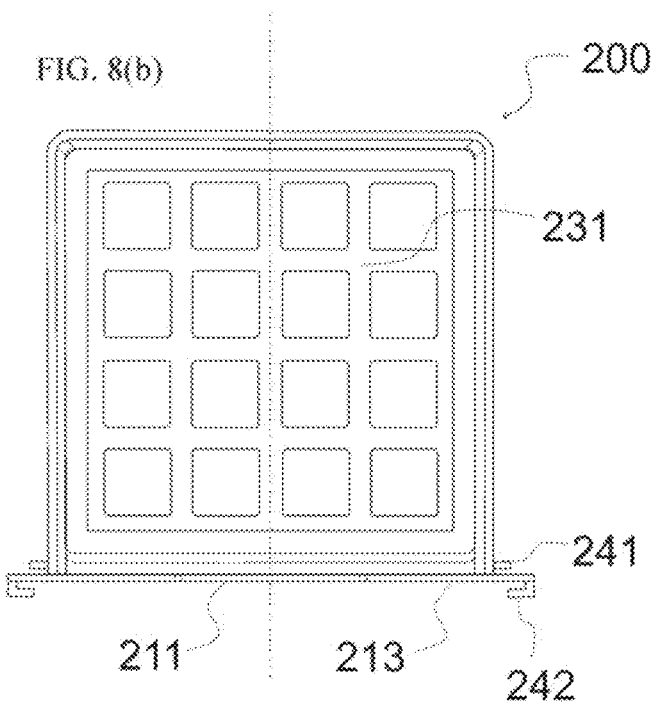
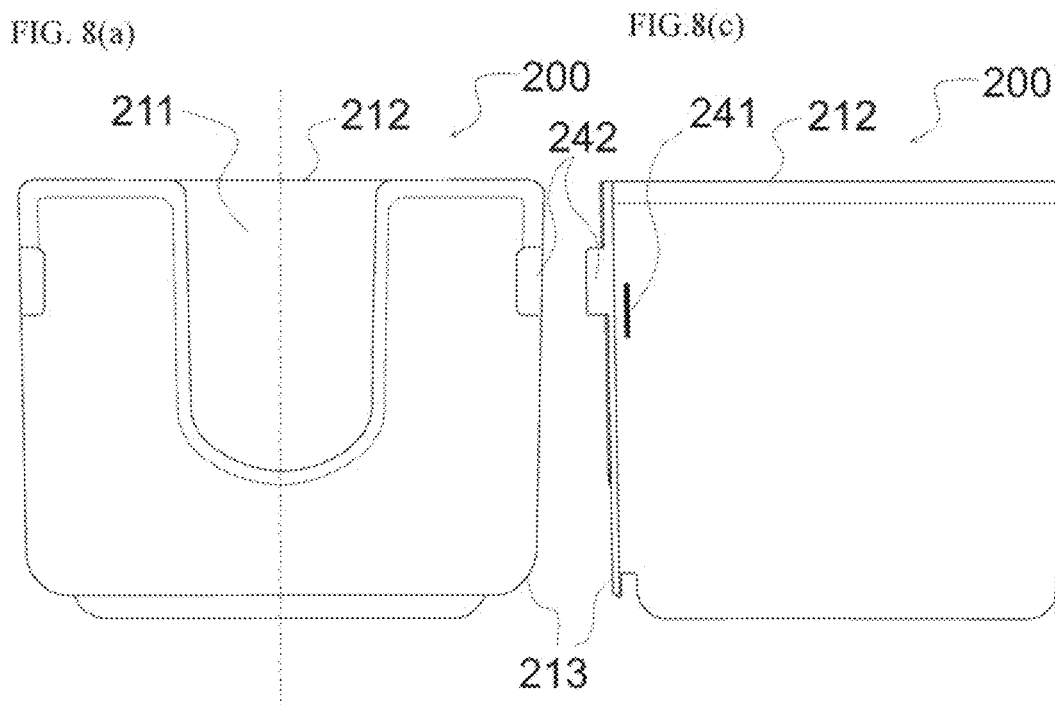

PLANTING CONTAINER UNIT AND GREENING METHOD USING SAME

TECHNICAL FIELD

The present invention relates to a planting container unit and a greening method using the container unit, and more specifically to a planting container unit that is installed on a front surface side of a wall surface, etc. of a building or a structure to green the front surface side of the wall surface, etc., and a greening method that installs the container unit onto green a wall surface, etc.

BACKGROUND ART

In recent years, demand for urban greening, etc. has been growing, and accordingly greening has been carried out at various places in urban areas, such as parks and sidewalks, by artificially planting trees, for example. In places particularly where buildings, structures, and the like stand side-by-side, there are few natural trees, etc., and therefore greening of wall surfaces of such buildings and structures has been actively pursued. There are various methods 70 as greening methods.

For example, Patent Literature 1 aims to provide a greening container unit that is easy to handle, can be installed very easily and in a short, time for greening of a wall surface, etc., and also has a low manufacturing cost, and provide a greening method. To this end, Patent Literature 1 discloses a container unit for greening characterized by forming an opening that is on one surface side of a container unit main body capable of housing a planting base, such as soil, and a pot plant, and through which a plant body part of a pot plant housed inside the container unit main body can be exposed to the outside.

The container unit of Patent Literature 1 is equipped with a planting base and a plant body directly onto the main body and has such a problem in terms of maintainability that the main body of the container unit needs to be removed when the plant dies or is replaced with another plant.

The disclosure of Patent Literature 2 relates to a multi-purpose planting base that has a pressing lid having open windows divided by pressing crosspieces, and a receiving saucer that supports an open side of the pressing lid and receives culture soil packed inside the pressing lid. This multi-purpose planting base is provided with a planting pot tray including planting pots that are exposed on the side of the open windows when housed inside the pressing lid.

The multi-purpose planting base of Patent Literature 2 can be used also for greening of a wall surface, as also described in FIGS. 10 and 11 of Patent Literature 2, as well as can be used in combination with a lawn sheet. Being usable for multiple purposes, this invention has a complicated structure as a whole and requires the pressing lid, the receiving saucer, the planting pot tray, and other constituent members, which add up to a large number of components. Since thus the structure is complicated and the number of components is large, the manufacturing cost is also high.

CITATION LIST

Patent Literature

Patent Literature 1: JP-A-2009-171953
Patent Literature 2: JP-A-2005-333976

SUMMARY OF INVENTION

Technical Problem

However, in the technique disclosed in Patent Literature 1, a planting base and a plant body are directly provided in the container unit main body, and replacing the plant requires replacing the whole container unit, causing a problem in that maintenance is not easy. Moreover, when disposing a plurality of container units, an upper container unit is merely placed on a lid of a lower container unit, while fixing of left and right container units is not taken into account. Thus, there is a problem in that the container units cannot stand alone without a protective body. The technique disclosed in Patent Literature 2 has a problem in that the manufacturing cost and the installation cost are high because of the complicated structure and the large number of components.

The present invention has been made in view of these problems, and aims to provide a planting container unit that is easy to handle, can be installed very easily and in a short time for greening of a wall surface, etc., and has excellent maintainability in that plants can be easily replaced, and to propose a greening method using this planting container unit.

Solution to Problem

As a result of earnest study, the present inventors have found that when a planting container unit has a double structure where an inner container is extracted and inserted from a front surface and fixed in a replaceable manner, improvements are made in terms of simplified installation, replacement of plants, and maintainability, which has led to the development of the present invention.

A planting container unit of the present invention that advantageously solves the above problems is a planting container unit having an outer container (100) having an upper-surface opening (111) and a front-surface opening (112), an inner container (200) that is engaged by being inserted into the front-surface opening (112) of the outer container, and a fixing plate (300) with which the inner container is fixed to the outer container. The planting container unit is characterized in that: the inner container is capable of housing a planting base (401), such as soil, and a pot plant (402), includes a front-surface opening (211) through which a plant body part of the pot plant is able to be exposed to an outside, and includes, separately from the front-surface opening (211), an upper-surface opening (212) for housing the planting base and the pot plant; the inner container has, on a front surface having the front-surface opening (211), a front-surface flange (213) that engages with a wall (113) of the outer container around the front-surface opening, and the planting container unit is configured such that, by combining the front-surface flange and the fixing plate with each other, the inner container is removably housed inside the outer container while closing the front-surface opening (112) of the outer container.

The planting container unit of the present invention is considered to have that following preferable solutions:

(a) The outer container has a water reservoir (121) at a bottom part, and has, at a center of the bottom part, a cylindrical through-hole (122) through which water overflowing from the water reservoir is released downward.

(b) The inner container has, at a bottom part, a lattice-shaped structure (231) that supports the housed planting base and pot plant and guides irrigation water downward.

(c) The outer container has at least one notch (141) formed in the front-surface opening (112) and at least one tab (142) provided at a top part (140) on a side of the front-surface opening;

the inner container has a tab (241) provided near the front-surface flange (213), on a side surface that is adjacent to the front-surface flange (213) and inserted into the front-surface opening (112) of the outer container, and hooked protrusions (242) that are provided on outer sides of both side edges of the front-surface flange such that the fixing plate is insertable into the hooked protrusions (242);

the fixing plate has a Z-shaped cross-section as seen in a side view;

the tab (241) is configured to be able to pass through the notch (141) when the inner container is inserted into the front-surface opening (112) of the outer container, and the wall (113) of the front-surface opening constituting a part under the notch (141) of the outer container is held between the tab (241) and the front-surface flange (213); and when the fixing plate is inserted into the hooked protrusions (242) of the inner container, a bent portion (341) of the fixing plate is fixed to an upper edge of the front-surface flange of the inner container, and an upper edge of the fixing plate is engaged with the tab (142) at a top part of the outer container.

(d) The front-surface flange (213) of the inner container and the fixing plate (300) are combined with each other so as not to close the opening (211) of the inner container.

(e) The planting container unit has a bottom flange (161) that is parallel to a bottom surface in an outer periphery of a bottom part of the outer container, and, when a plurality of container units is vertically disposed, the bottom part of the outer container of an upper container unit is inserted into the upper-surface opening (111) of the outer container of a lower container unit, and the upper-surface opening (111) of the outer container of the lower container unit is closed by the bottom part and the bottom flange (161) of the outer container of the upper container unit.

(f) The outer container incudes, on a back surface side of a top part, an engaging portion (171) for engaging the container unit with a wall-mounting holder (601) that holds the container unit, (g) The outer container further includes a groove (181) into which an irrigation pipe for providing irrigation is inserted; and the groove is configured to have a projecting portion (182) on one side surface and a receiving portion (183) into which the projecting portion is insertable on the other side surface.

(h) When a plurality of planting container units is vertically disposed, an uppermost planting container unit further includes a lid (500).

(i) At least one of the outer container, the inner container, and the fixing plate is entirely composed of synthetic resin.

(j) The lid is entirely composed of synthetic resin.

A greening method of the present invention that advantageously solves the above problems includes installing a plurality of planting container units (1) according to any one of the above-described planting container units (1) by arranging the planting container units (1) at least vertically, characterized by selecting at least one of the following two options: arranging the outer containers (100) independently and arranging the planting container units (1) with a planting base (401) and a pot plant (402) housed in the inner container (200).

The greening method of the present invention is considered to have preferable solutions as follows:

(k) The inner container (200) housing a planting base and a pot plant is inserted into the outer container (100) that has been independently arranged, and the inner container (200) is fixed with the fixing plate (300).

(l) The fixing plate is removed from the arranged planting container unit in which a planting base and a pot plant are housed in the inner container (200) to extract the inner container.

(m) The fixing plate is removed from the arranged planting container unit in which a planting base and a pot plant are housed in the inner container, and the inner container is extracted from the outer container; and a different inner container housing a planting base and a pot plant is inserted into the outer container and fixed with the fixing plate.

(n) When installing a plurality of planting container units by arranging the planting container units vertically and horizontally, a bottom part of an outer container of an upper planting container unit is inserted so as to close an upper-surface opening of an outer container of a lower planting container unit; and left and right planting container units are installed with a projecting portion (182) of one of outer containers of the planting container units fitted into a receiving portion (183) of the other one.

(o) The outer container includes, on a back surface side of a top part, an engaging portion (171) for engaging the planting container unit with a wall-mounting holder (601) that holds the planting container unit; and the container unit is held on the wall-mounting holder by engaging the engaging portion with the wall-mounting holder.

(p) A floor-mounting holder (602) that serves also for drainage is installed on a floor (3) near a wall surface (2); and when a plurality of planting container units is vertically disposed, a lowermost planting container unit is supported by the floor-mounting holder that serves also for drainage.

Advantageous Effects of Invention

As described above, the present invention is a planting container unit having: an outer container (100) having an upper-surface opening (111) and a front-surface opening (112); an inner container (200) that is engaged by being inserted into the front-surface opening (112) of the outer container; and a fixing plate (300) with which the inner container is fixed to the outer container. The inner container is capable of housing a planting base (401), such as soil, and a pot plant (402), includes a front-surface opening (211) through which a plant body part of the pot plant is able to be exposed to an outside, and includes, separately from the front-surface opening (211), an upper-surface opening (212) for housing the planting base and the pot plant. On a front surface having the front-surface opening (211), the inner container has a front-surface flange (213) that engages with a wall (113) of the outer container around the front-surface opening. The planting container unit is configured such that, by combining the front-surface flange and the fixing plate with each other, the inner container is removably housed inside the outer container while closing the front-surface opening (112) of the outer container. This container unit has an advantage in that greening of a wall surface, etc. can be carried out by work that is very simple as a whole: housing a planting base, such as soil, and a pot plant in the inner container of the container unit, exposing the plant part of the pot plant through the front surface-side opening of the container unit to the outside, and disposing a large number of such container units on a front surface side of the wall surface, etc.

As a result, the installation time is also shortened and the manufacturing costs of tools for installation can also be reduced. Thus, there is an advantage in that costs can be significantly reduced compared with those of conventional installation of so-called quick wall surface greening by which greening of a wall surface is easily carried out.

The inner container can be easily mounted to and removed from the outer container by attaching and detaching the fixing plate, obtaining such an advantage capable of independently installing the outer container, installing the inner container housing a plant as an add-on, and easily replacing plants taking design and maintenance into account.

Another advantage is that common pot plants can be planted as they are, which eliminates the need for special care. Yet another advantage is that work such as replacing some of inner containers in which the pot plants are growing poorly can also be easily performed. In addition, an advantage is achieved in that it is easy to design, or the like, a national flag or a picture on a wall surface by using pot plants having different flower colors.

When the container units are vertically placed on top of one another, the bottom part of an upper container unit functions as-is as a lid of a lower unit. Thus, the container units can be installed without an increase in the number of components, and are therefore economical and excellent in installability.

An advantage is also achieved in that the fixing plate restricts the opening through which a plant body part can be exposed to the outside and thereby reduces a wind pressure acting on the exposed plant.

Further, since the water reservoir is provided at the bottom part of the outer container and the cylindrical through-hole through which water overflowing from the water reservoir is released downward is provided at the center of the bottom part, when a plurality of container units is vertically arranged, water having been introduced into an upper container unit by irrigation, etc. is introduced also into a lower container unit through the cylindrical through-hole. Thus, there is an advantage in that a very good circulation of water among a plurality of vertically disposed container units is achieved.

In particular, in the case of installation in which the inner container having a lattice-shaped structure at the bottom part is inserted and fixed with a planting base and a pot plant housed therein, water having been introduced into an upper container unit by irrigation, etc. passes through the planting base, etc housed inside the inner container of this upper container unit, or passes through a gap between the inner container and the outer container thereof, and is appropriately collected in the water reservoir of the outer container of the upper container unit. Then, this water is appropriately guided into a lower container unit as overflowing water through the cylindrical through-hole set at the center of the water reservoir.

Further, in the case where a groove into which an irrigation pipe for providing irrigation is inserted is formed in the outer container, there is an advantage in that when setting a large number of planting container units on a front surface side of a wall surface, etc. with a planting base and a pot plant housed inside the inner container of the planting container unit as described above, irrigation for the planting bases and the pot plants inside the set inner containers can be appropriately and easily provided. In the case where the groove into which an irrigation pipe is inserted as described above is formed in the outer container of an uppermost container unit vertically set, and this groove is covered by a lid, this can reliably produce the advantage that, as described above, a very good circulation of water among the plurality of vertically arranged container units is achieved as water having been introduced into an upper container unit is guided to a lower container unit through the cylindrical through-hole that now communicates with the lower container unit.

The projecting portion is provided in the groove on one side, and the receiving portion into which this projecting portion is insertable is provided in the groove on the other side. Thus, when the planting container units are disposed vertically and horizontally, left and right container units can be firmly fitted to each other, so that a wall surface greening unit can also be structurally securely formed.

Further, when at least one of the outer container, the inner container, and the fixing plate is entirely composed of synthetic resin, or the lid is entirely composed of synthetic resin, the container unit is made lightweight, so that the handling and the work efficiency of the container unit, leading to the work efficiency of installation for greening improve. As the entire container unit is thus made lightweight, when the container unit is reduced in size, it can be handled by one hand even with a plant and a planting base planted therein. As a result, the setting work can be very easily performed.

Further, when installing the container unit, first, the outer container is independently installed, and then the inner container housing a planting base and a pot plant is inserted and fixed with the fixing plate. In this way, a design according to a client's request or suitable to an event can be created as wall surface greening. When a plant in a container unit, that has already been installed with a planting base, etc. housed therein dies, the fixing plate of that container unit can be removed and the inner container can be extracted. This inner container can be easily replaced by inserting another inner container housing a new plant, etc. into the now empty outer container and fixing the inner container with the fixing plate. Thus, maintenance can be easily performed without affecting the overall structure.

In the case where a plurality of container units housing a planting base and a pot plant is held on the wall-mounting holders by engaging the engaging portions of the outer containers of the container units on the wall-mounting holders, the work of arranging the plurality of container units vertically or horizontally can be performed more easily and quickly by means of these wall-mounting holders by engaging the engaging portions of the outer containers with the wall-mounting holders. As a result, the work efficiency of installation for greening is further improved.

In particular, since the container units are held by engaging the engaging portions of the outer containers with the wall-mounting holders, safe and easy installation can be realized. Further, when a lowermost container unit can be supported by a floor-mounting holder that serves also for drainage, this is convenient because both positioning and drainage of a group of container units can be achieved.

BRIEF DESCRIPTION OF DRAWINGS

FIGS. 6 (a) and 6(b) are each a vertical sectional view of the planting container unit according to the embodiment, with FIG. 6(a) being a view of section A-A of FIG. 1 and FIG. 6(b) being a view of section B-B of FIG. 2.

FIGS. 8 (a) to 8(c) are each a three-sided view of an inner container of the planting container unit according to the embodiment, with FIG. 8(a) being a front view, FIG. 8(b) being a plan view, and FIG. 8(c) being a side view.

DESCRIPTION OF EMBODIMENTS

An embodiments of the present invention will be described below based on the drawings. A greening system using a planting container unit of the embodiment is composed of a planting container unit 1 as shown in FIGS. 1 to 6 and support members as shown in FIGS. 11 to 14.

Figure 1:
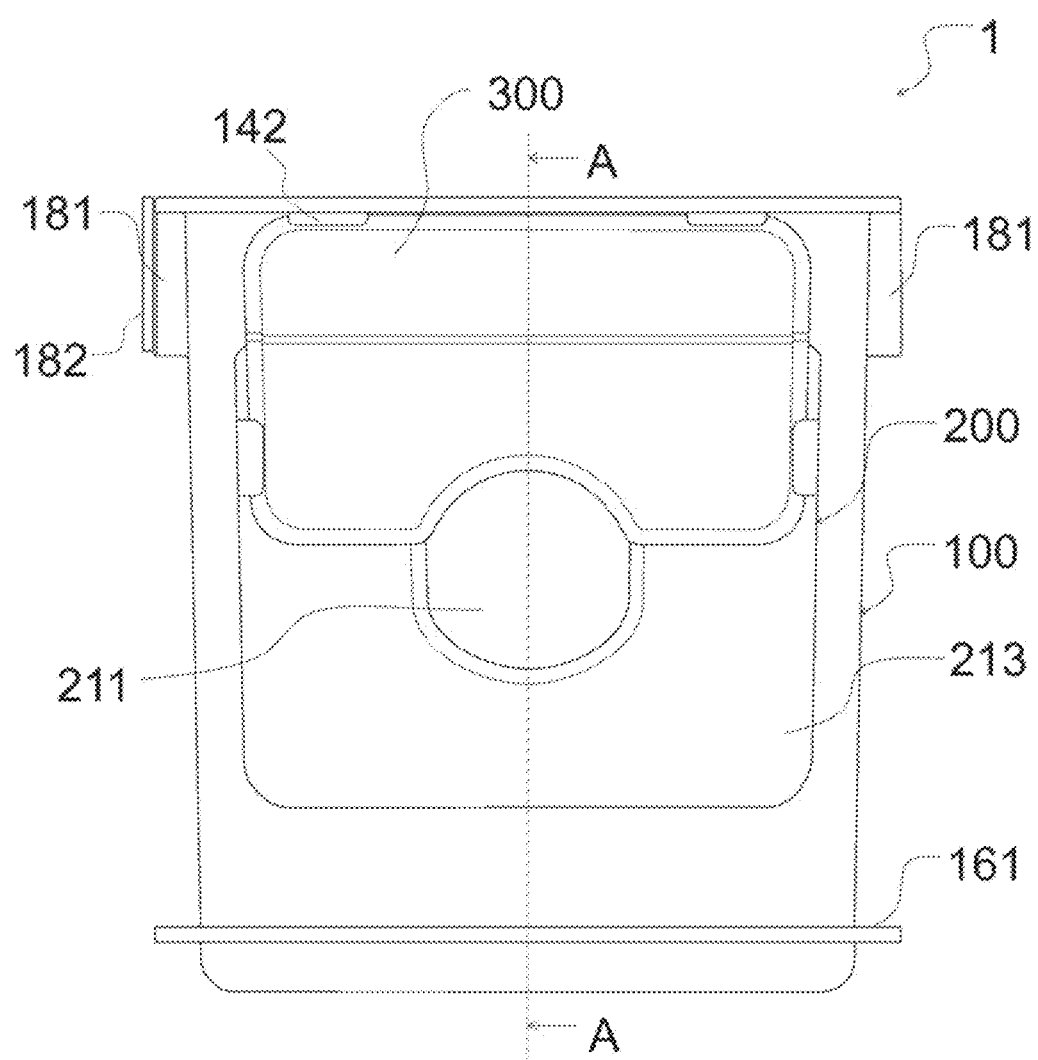
FIG. 1 is a front view showing an assembled state of a planting container unit according to one embodiment of the present invention.
Figure 2:
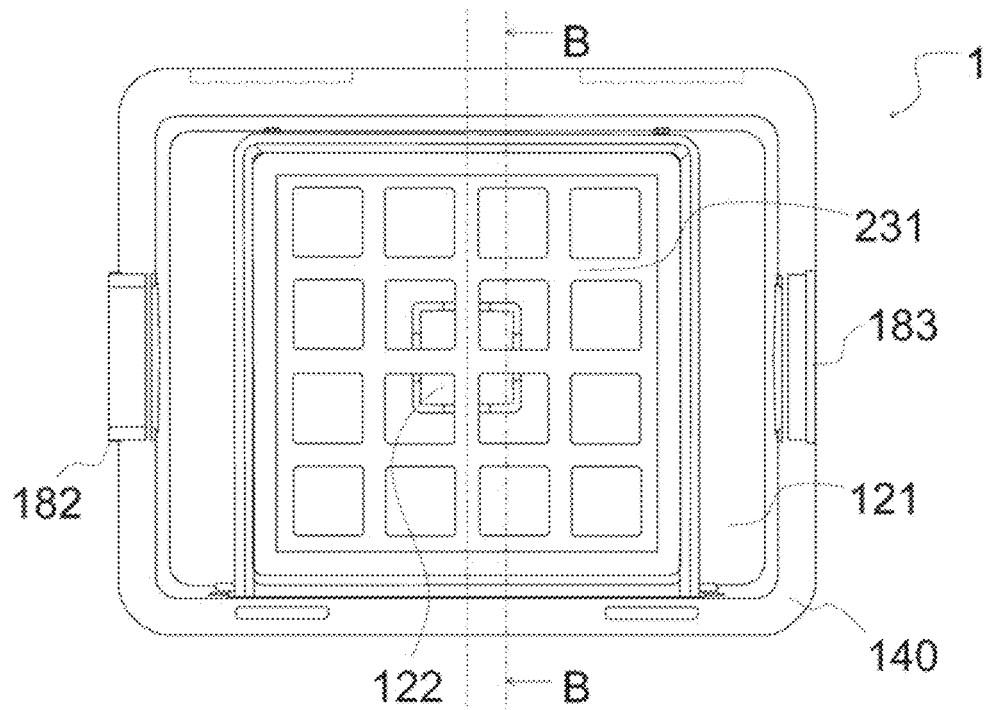
FIG. 2 is a plan view showing the assembled state of the planting container unit according to the embodiment.
Figure 3:
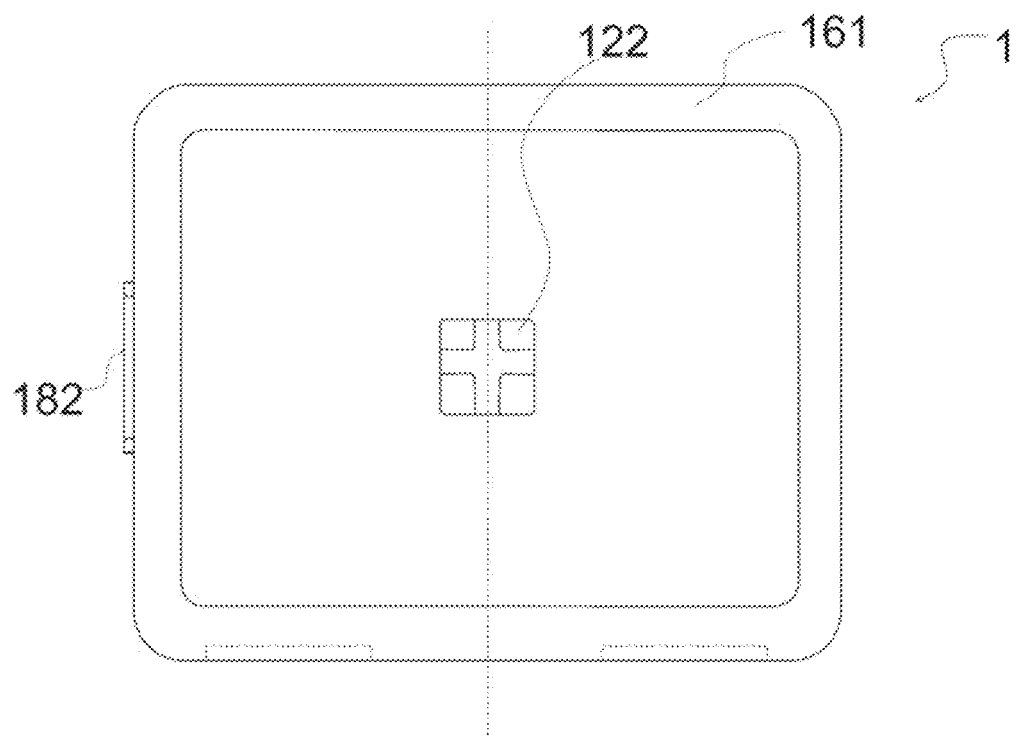
FIG. 3 is a bottom view showing the assembled state of the planting container unit according to the embodiment.
Figure 4:
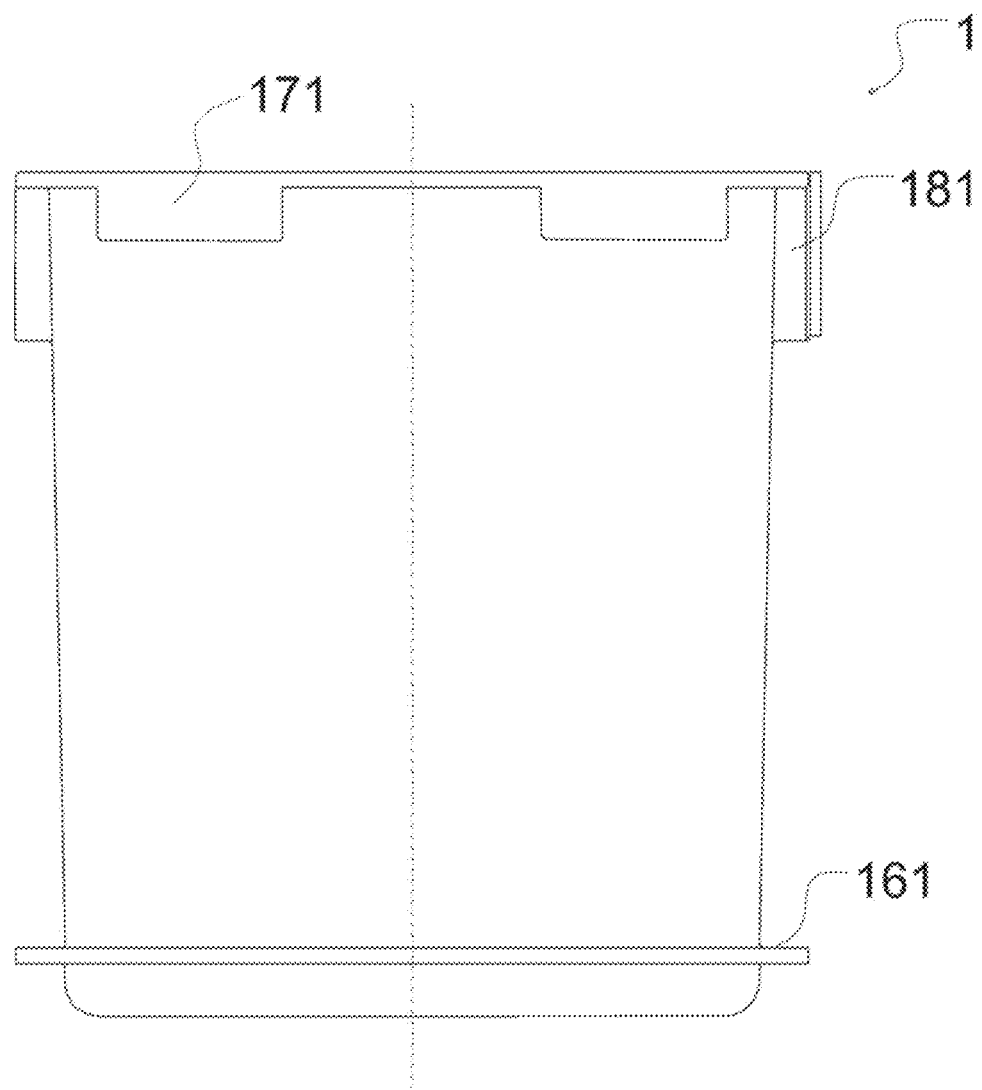
FIG. 4 is a back view showing the assembled state of the planting container unit according to the embodiment.
Figure 5:
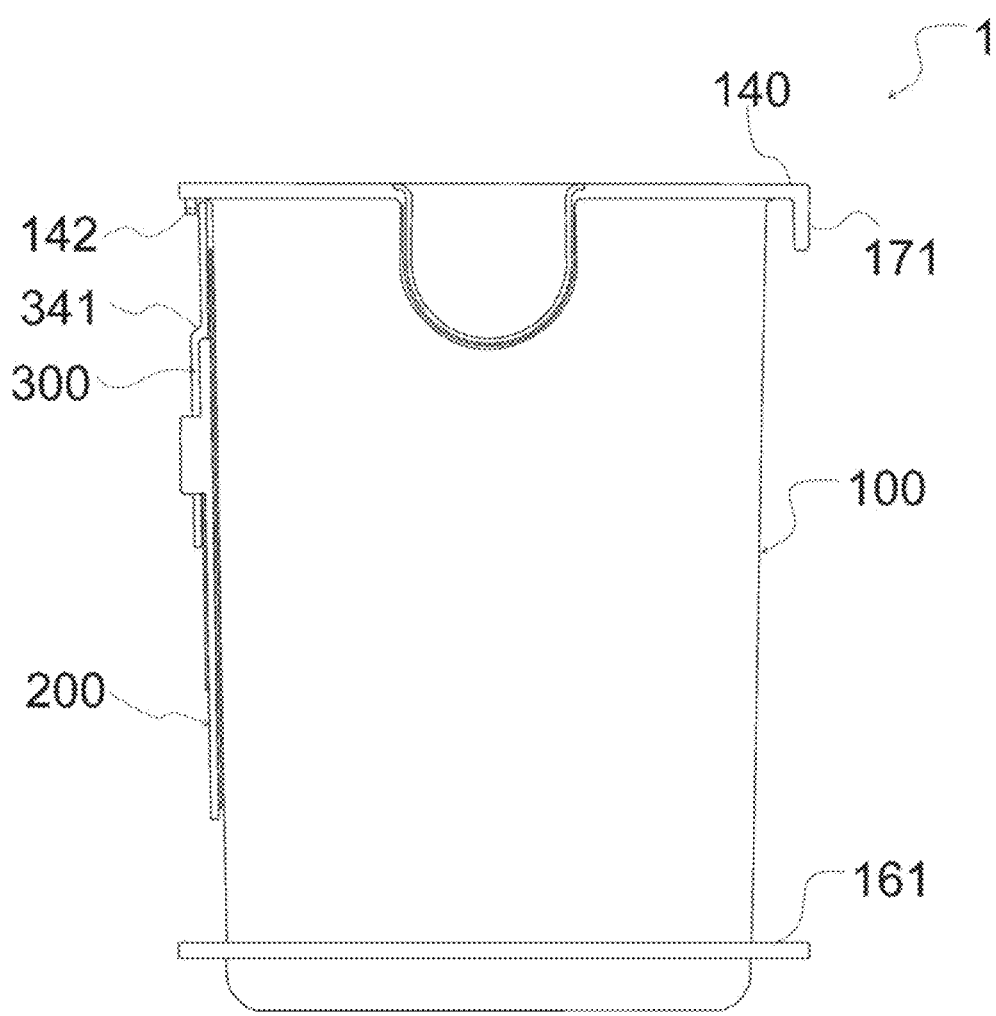
FIG. 5 is a right-side view showing the assembled state of the planting container unit according to the embodiment.
Figure 7:
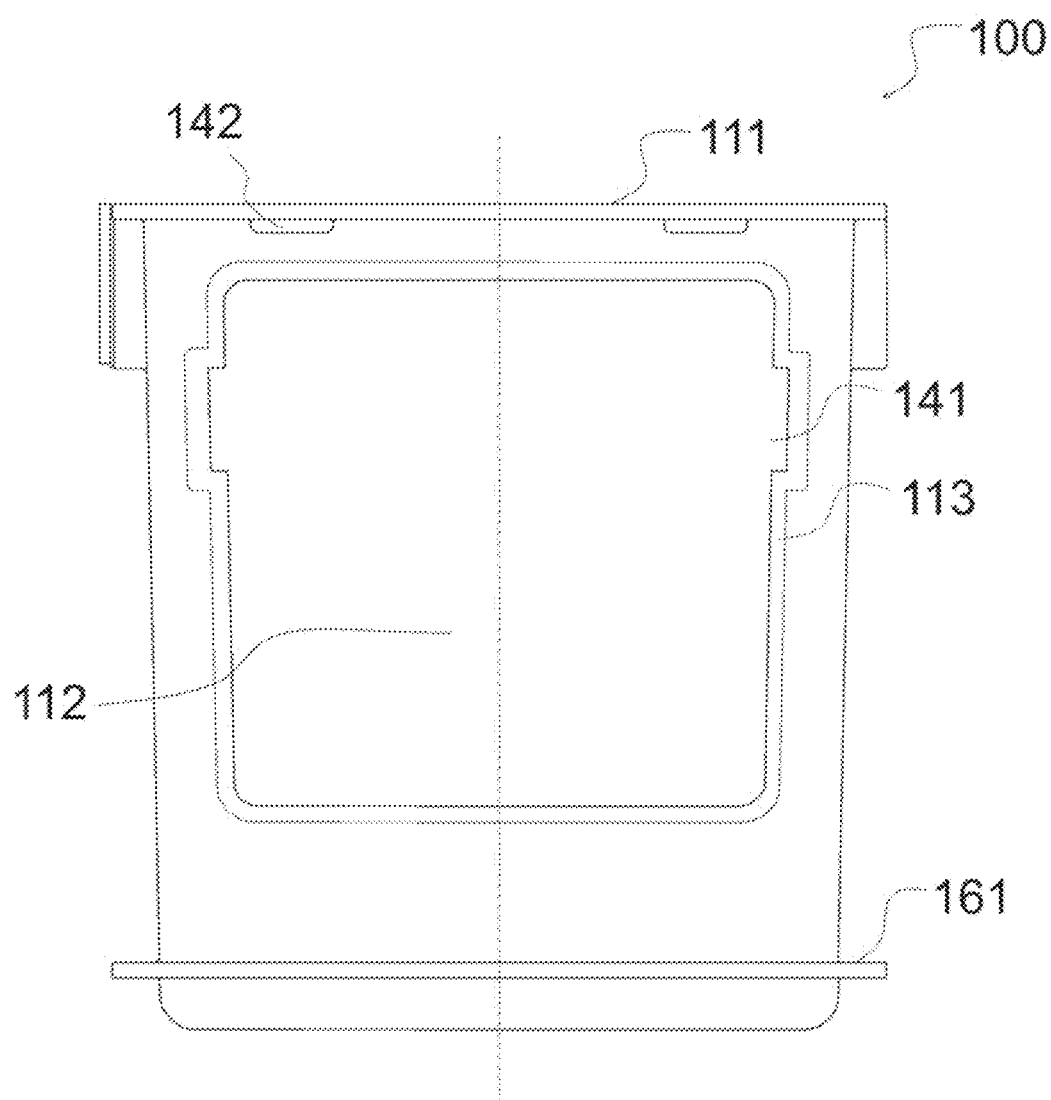
FIG. 7 is a front view of an outer container of the planting container unit according to the embodiment.

FIGS. 1 to 6 show an assembled state of the planting container unit 1 according to one embodiment of the present invention. FIG. 1 is a front view; FIG. 2 is a plan view; FIG. 3 is a bottom view; FIG. 4 is a back view; and FIG. 5 is a right-side view. A left side view is shown as symmetrical with the right-side view. FIGS. 6(a) and 6(b) is a vertical sectional view, with a left half 6(a) being a view of section A-A of FIG. 1 and a right half 6(b) being a view of section B-B of FIG. 2. FIG. 7 shows a front view of an outer container 100 in the embodiment. FIG. 8 are each a three-sided view of an inner container of the embodiment, with 8(a) being a front view, 8(b) being a plan view, and 8(c) being a right-side view.

Figure 9:
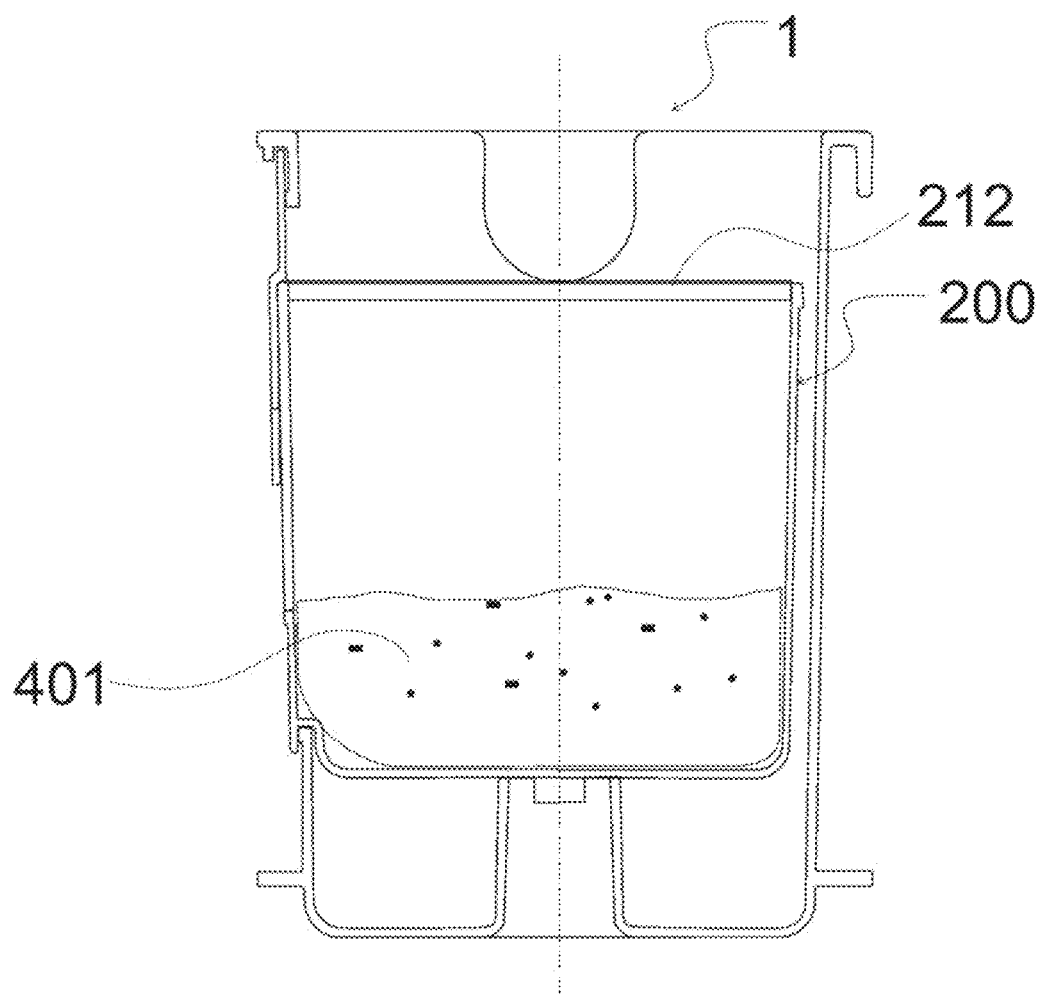
FIG. 9 is a sectional view showing a state where soil is housed inside a room part of the inner container up to a predetermined level.
Figure 10:
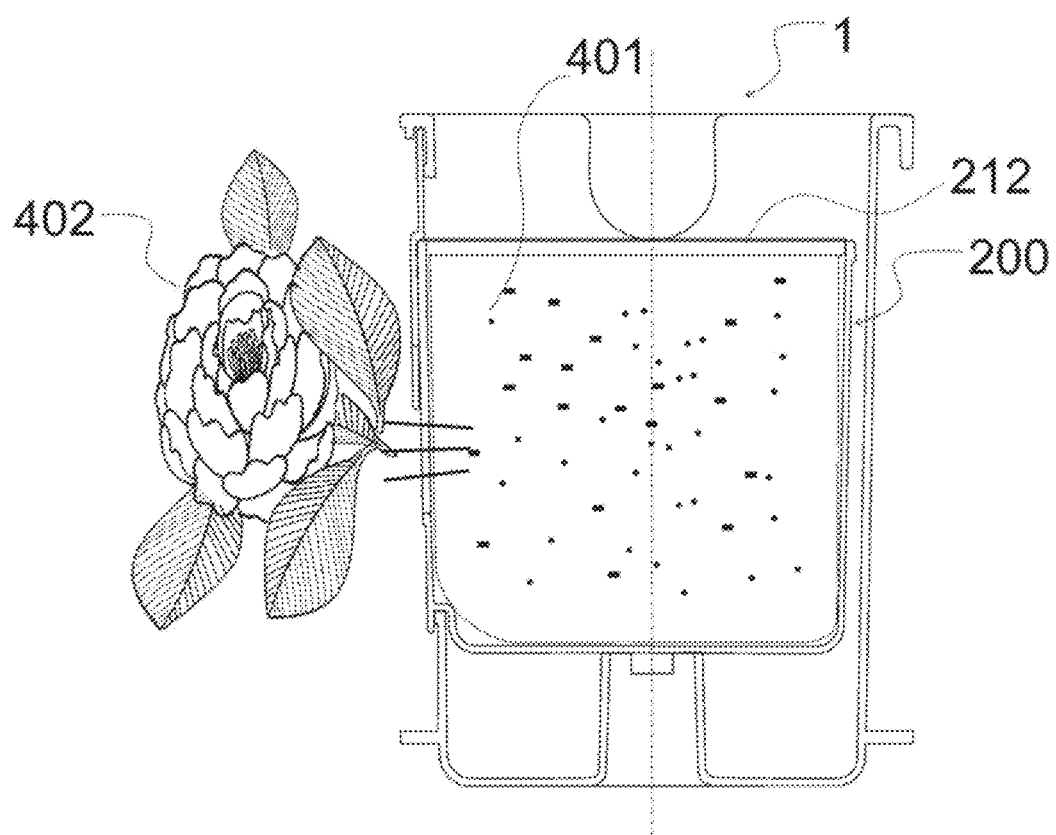
FIG. 10 is a sectional view of a state where a pot plant is housed inside the room part of the inner container.

The planting container unit 1 of the present invention is formed by combining the outer container 100, an inner container 200, and a fixing plate 300. As shown in FIGS. 1 to 6 and FIG. 7, the outer container 100 has an upper-surface opening 111 and a front-surface opening 112. As shown in FIGS. 1, 2, 6, and 8, the inner container 200 is engaged by being inserted into the front-surface opening 112 of the outer container 100, and the inner container 200 also has a front-surface opening 211 and an upper-surface opening 212 as with the outer container. The inner container 200 is fixed with the fixing plate 300 on a front surface side of the outer container 100. As shown in FIGS. 9 and 10, a planting base 401, such as soil, and a pot plant 402 can be housed in the inner container 200 through the upper-surface opening 212, while a plant body part of that pot plant can be exposed to an outside through the front-surface opening 211. As shown in the front view of FIG. 1, the side view of FIG. 5, and the sectional view of FIG. 6, the inner container 200 has, on a front surface having the front-surface opening, a front-surface flange 213 that engages with a wall of the outer container around the front-surface opening. The planting container unit is configured such that, by combining the front-surface flange 213 and the fixing plate 300 with each other, the inner container is removably housed inside the outer container while closing the front-surface opening 112 of the outer container. This configuration makes it possible to easily put a planting base and a pot plant into and out of the container unit, and to expose the plant body from the front surface of the container unit, which is effective in greening a wall surface.

As shown in FIG. 6, it is preferable that a water reservoir 121 be formed at a bottom part of the outer container 100, and that a cylindrical through-hole 122 through which water overflowing from the water reservoir is released downward be provided at a center of the bottom part. As shown in FIG. 2 and FIG. 8 (b), it is preferable that a bottom surface of the inner container 200 have a lattice-shaped structure 231 so as to be able to support the housed planting base and pot plant and guide irrigation water, etc. downward. This has an advantage in that water having been introduced by irrigation, etc. passes through the planting base, etc. housed inside the inner container, or passes through a gap between the inner container and the outer container, and is appropriately collected in the water reservoir 121 of the outer container. In the example of FIG. 6, a notch is provided at an upper edge of the cylindrical through-hole to allow water overflowing from the water reservoir to flow downward efficiently.

As a mechanism for fixing the inner container to the outer container, as shown in FIG. 7, it is preferable that the outer container 100 have at least one notch 141 formed around the front-surface opening 112 and at least one tab 142 formed at a top part 140 on the side of the front-surface opening. As shown in FIG. 8, it is preferable that the inner container 200 have a tab 241 provided at a position near the front-surface flange 213, on a side surface that is adjacent to the front-surface flange and inserted into the front-surface opening of the outer container, and have hooked protrusions 242 that are provided on outer sides of both side edges of the front-surface flange 213 and into which the fixing plate 300 is insertable. As shown in FIG. 6, it is preferable that the fixing plate 300 have a Z-shaped cross-section as seen in a side view. It is preferable that the tab 241 on the side surfaces of the inner container be configured to be able to pass through the notch 141 in the front-surface opening of the outer container when the inner container 200 is inserted into the front-surface opening 112 of the outer container 100, and that the wall 113 of the front-surface opening that constitutes a part under the notch of the outer container be held between the tab 241 and the front-surface flange 213 of the inner container. As shown in FIG. 5, it is preferable that when the fixing plate 300 is inserted into the hooked protrusions 242 of the inner container, a bent portion 341 of the fixing plate be fixed to an upper edge of the front-surface flange of the inner container while an upper edge of the fixing plate be engaged with the tab 142 at the top part of the outer container. This fixing mechanism makes it possible to easily assemble the container unit, and to easily extract and insert the inner container from and into the outer container as well as fix the inner container to the outer container.

As shown in FIG. 1, it is preferable that the front-surface opening 211 of the inner container be an opening large enough to be able to expose the plant body of the housed pot plant such that, when the inner container 200 is fixed to the outer container 100, the inner container and the fixing plate do not close the front-surface opening 211 of the inner container. An advantage is achieved in that this fixing plate restricts the opening of the front-surface opening of the inner container and thereby prevents planting soil from scattering through the opening or reduces a wind pressure acting on a plant body exposed through the opening.

Figure 11:
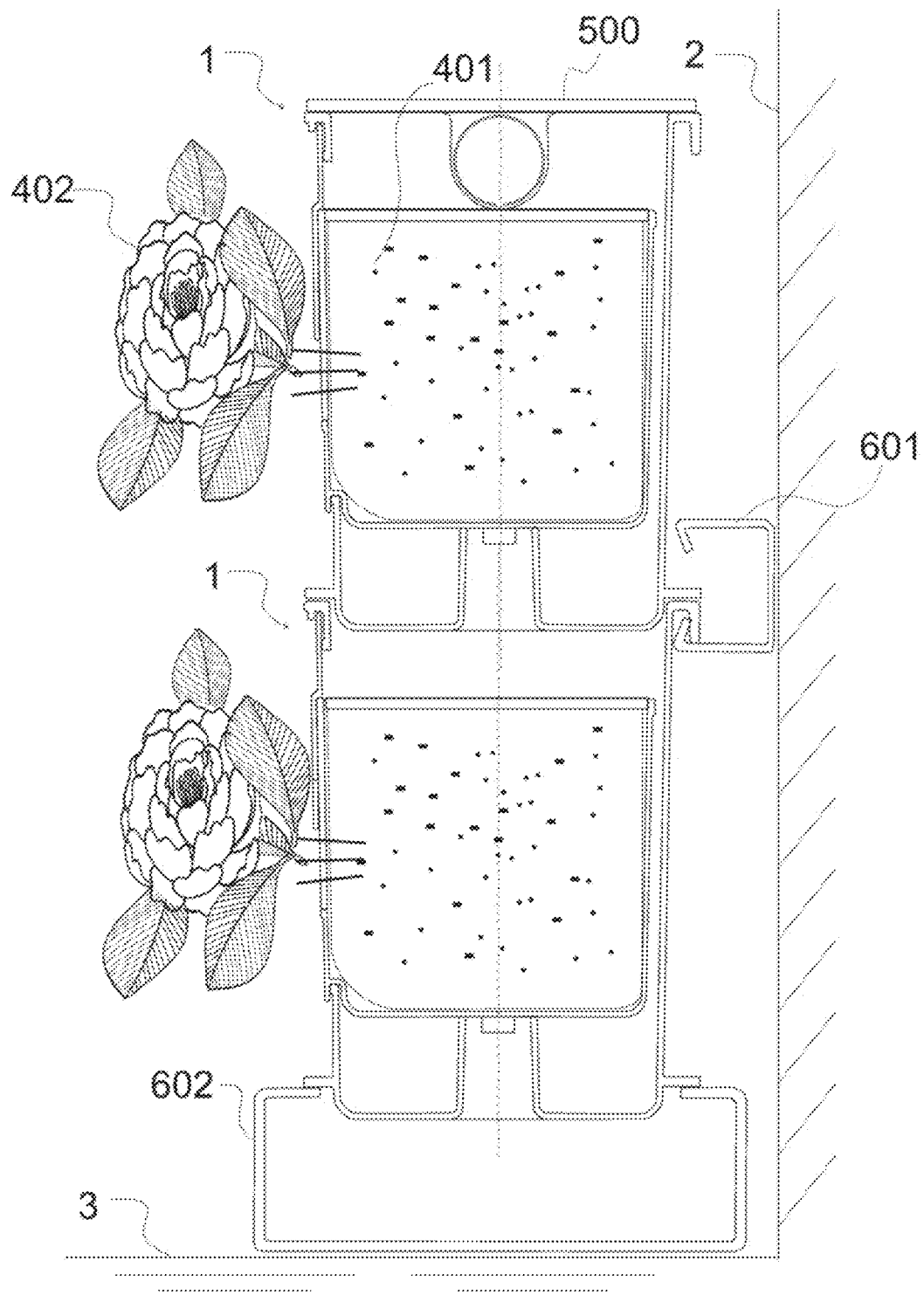
FIG. 11 is a sectional view showing how the planting container units with plants planted therein are set in place.

It is preferable that a bottom flange 161 that is parallel to a bottom surface be provided in an outer periphery of the bottom part of the outer container, and that, as shown in FIG. 11, when a plurality of container units is vertically disposed, the bottom part of the outer container of the upper container unit be inserted into the upper-surface opening 111 of the outer container of the lower container unit, while the upper-surface opening 111 of the outer container of the lower container unit be closed by the bottom part and the bottom flange 161 of the outer container of the upper container unit. Thus, as the bottom part of the outer container of the upper container unit functions as a lid of the outer container of the lower container unit and seals the outer container, irrigation water, etc. and a planting base can be prevented from scattering through the upper-surface opening of the container unit. In addition, a structure composed of a plurality of container units can be strongly formed as a greening system.

Further, as shown in FIG. 4 and FIG. 5, it is preferable that engaging portions 171 be included on a back surface side of the top part of the outer container. As shown in FIG. 11, etc., the container unit can be engaged with a wall-mounting holder 601 that holds the container unit. It is also possible to form, in the outer container, a groove 181 into which an irrigation pipe for providing irrigation is inserted. It is also possible to add a lid 500 to an uppermost container unit.

At least one of the outer container, the inner container, and the fixing plate is entirely composed of synthetic resin, for example, or the lid is entirely composed of synthetic resin, for example. While the type of synthetic resin is not particularly limited, a general-purpose synthetic resin, such as polyethylene, polypropylene, polystyrene, or polyester, can be suitably used. In particular, it is desirable that weather-resistant polypropylene be used.

FIG. 9 shows a sectional view of a state where the planting base 401 is housed inside a room part of the inner container 200 up to a predetermined level. FIG. 10 shows a sectional view of a state where the pot plant 402 is housed inside the room part of the inner container 200.

Next, a greening method of the present invention will be described. FIG. 11 is a sectional view showing how the planting container units with plants planted therein are set in place. The greening method of the present invention involves preparing a plurality of outer containers 100 of the planting container units 1 of the present invention, or a plurality of container units 1 in each of which the planting base 401 and the pot plant 402 are housed in the inner container 200 and the inner container 200 is fixed to the outer container, or a mixture of such outer containers 100 and container units 1, and installing them at least vertically, with the openings of the outer containers 100 or the container units 1 facing the front surface. In the example of FIG. 11, the container units with plants planted therein are installed on a floor surface 3 along the wall surface 2 by being vertically combined in two tiers.

Figure 12:
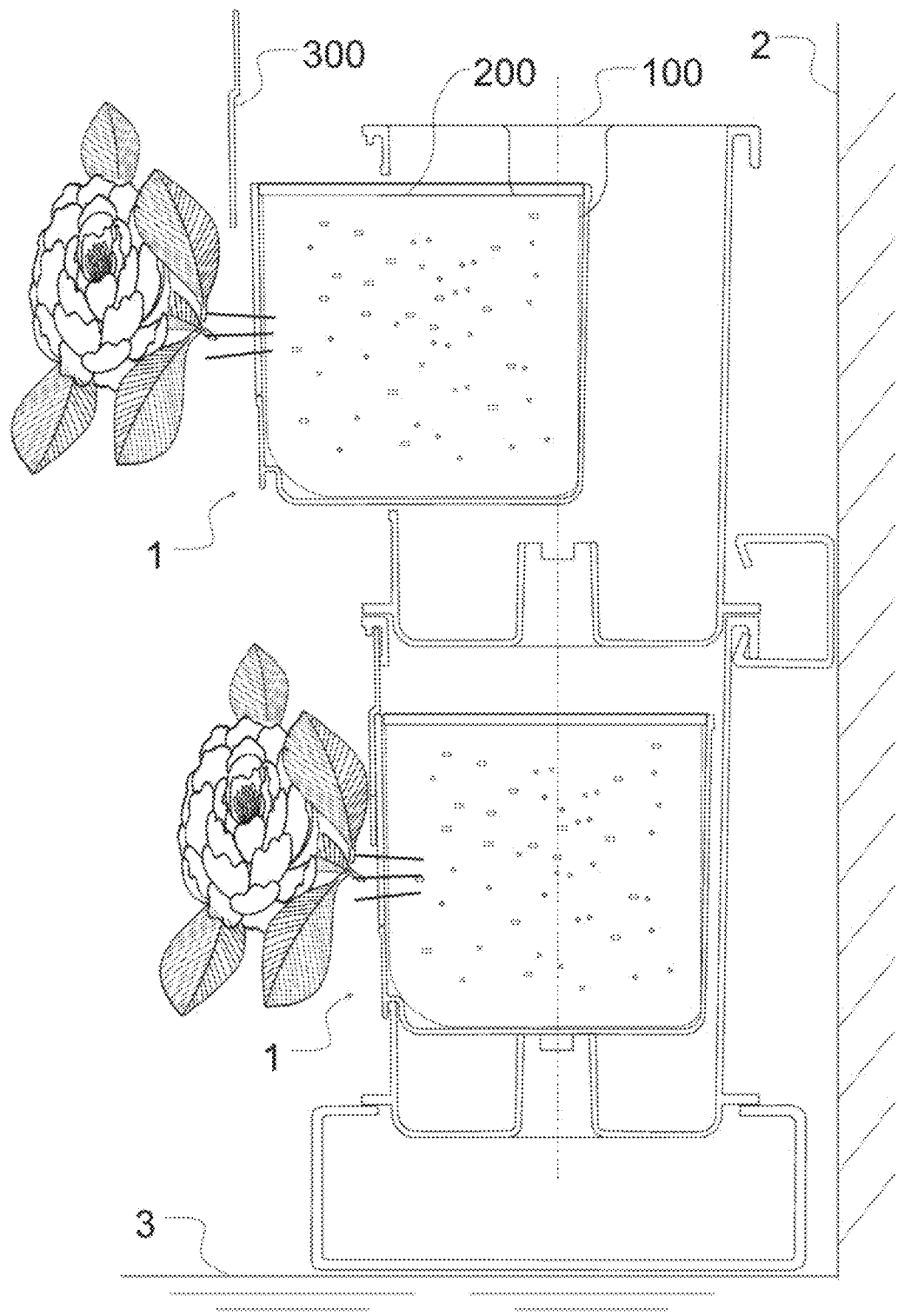
FIG. 12 is a conceptual view showing a state where the inner container is being extracted from and inserted into the planting container unit after installation.

FIG. 12 shows a conceptual view of a state where the inner container is being extracted from and inserted into the planting container unit after installation. An inner container housing a planting base and a pot plant can be installed by inserting the inner container into the outer container that has been independently installed (in FIG. 12, the upper container unit) and fixing the inner container with the fixing plate. It is also possible to extract the inner container by removing the fixing plate 300 from the arranged container unit in which a planting base and a pot plant are housed in the inner container. Thus, such installation is also possible in which a different inner container housing a planting base and a pot plant is inserted into an empty outer container and fixed with the fixing plate. By thus combining the container units of the present invention, installation excellent in design and maintainability can be carried out.

Figure 13:
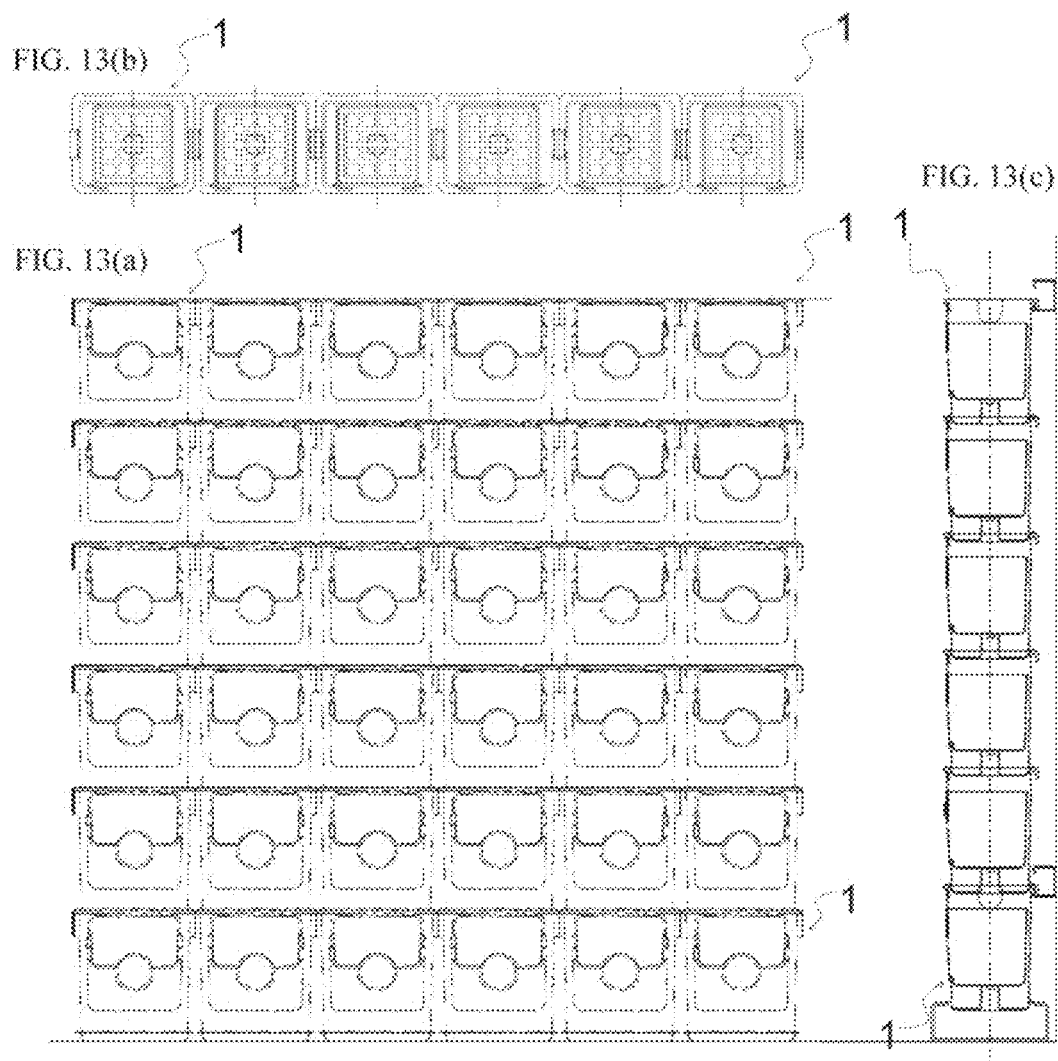
FIG. 13 are each a schematic three-sided view of a state where a large number of planting container units are held on wall-mounting holders, with FIG. 13(a) being a front view with plants planted, FIG. 13(b) being a plan view before planting, and FIG. 13(c) being a side view with plants planted.

As shown in FIG. 13, a plurality of container units can be arranged not only vertically but also horizontally. It is also possible to engage the engaging portions 171 of the outer container with the wall-mounting holder 601 and hold the container unit on the holder. As the wall-mounting holder 601, it is preferable that a metal piece of a groove shape with a lip, for example, be arranged on a wall surface. This wall-mounting holder can also be set for every third or fourth tier. It is also possible to support a lowermost planting container unit on a floor-mounting holder 602 that serves also for drainage. Further, the container units of the present invention installed vertically and horizontally can be structurally strongly combined with one another by fitting the projecting portion 182 provided in the groove of one planting container unit into the receiving portion 183 provided in the groove of an adjacent planting container unit.

As the wall-mounting holder 601 and the floor-mounting holder 602, for example, holders composed of steel are used, or these holders can also be composed of synthetic resin, wood, etc.

As the planting base 401, for example, soil is used, and as the soil, either artificial soil or natural soil can be used. Essentially, the material of the planting base is not limited to soil as long as a plant can grow. For example, a synthetic resin foam, a fiber material, or a mat member can also be used.

Figure 14:
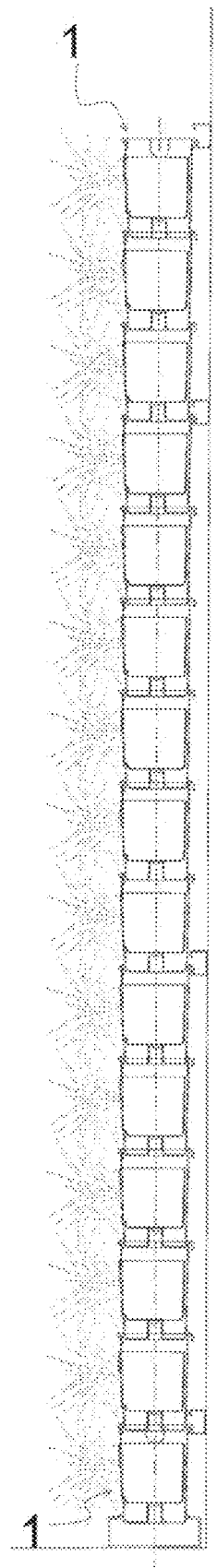
FIG. 14 is a schematic side view showing an aspect of arrangement of the planting container units in another embodiment.

FIG. 14 shows a side view of an example in which the container units are stacked in 15 tiers as another embodiment. The floor-mounting holder that serves also for drainage is set on the floor surface 3 to support the bottom part of the lowermost container unit, and the wall-mounting holders 601 are set so as to engage the engaging portions of the container units in the first tier, the sixth tier, the twelfth tier, and the uppermost tier.

Figure 15:
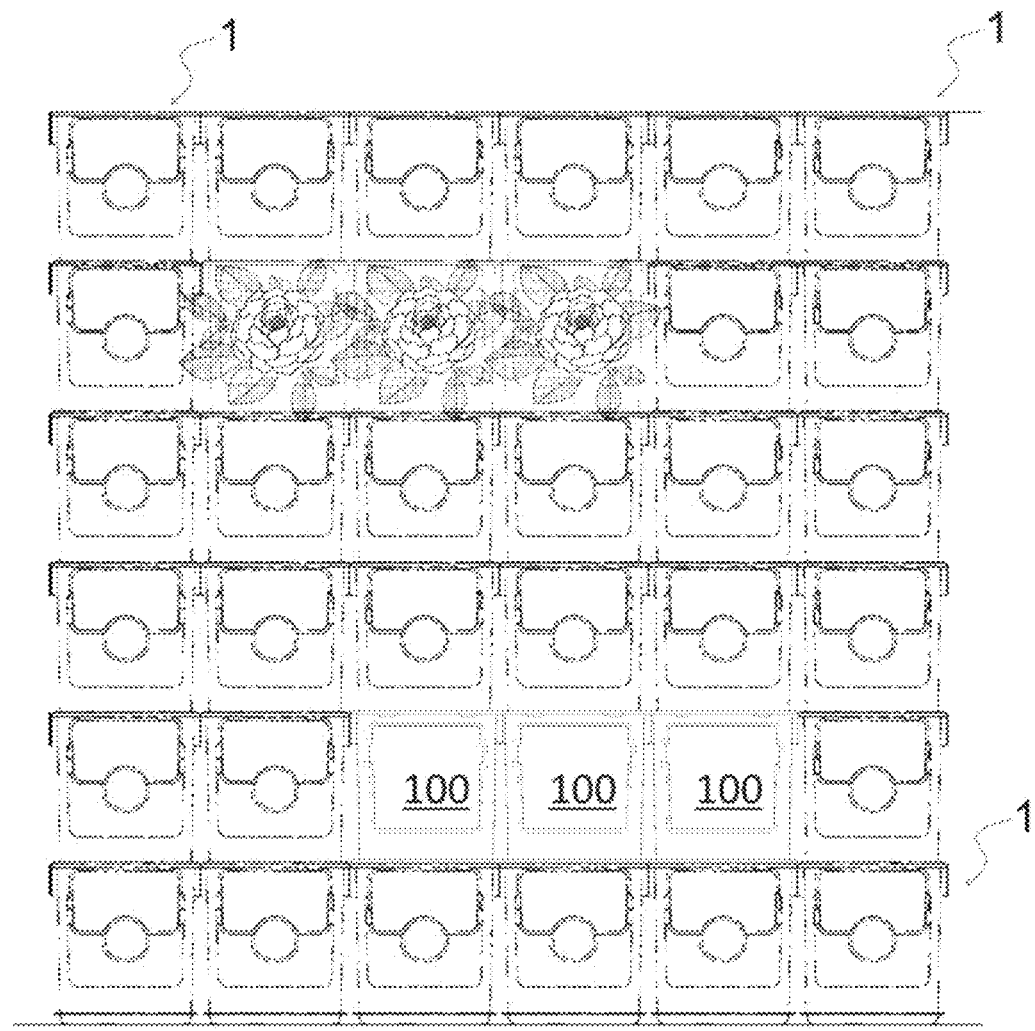
FIG. 15 is a schematic front view showing an aspect of arrangement of the planting container units in the embodiment.

FIG. 15 shows a schematic front view of an aspect of arrangement of the planting container units in another embodiment. It shows a state where the inner containers in three rows of the second tier from bottom have been extracted for maintenance. It shows an example in which plants in the second to fourth row from left of the second tier from top have been replaced with different plants from others. Such work can be easily performed without destroying the greening structure.

INDUSTRIAL APPLICABILITY

As has been described above, the main purpose of the planting container unit according to the present invention is to set a large number of planting container units vertically and horizontally on a front surface side of a wall surface for greening of the wall surface as described above. However, this planting container unit is not limited to being used for greening of a wall surface and can also be used for other greening purposes, such as indoor greening.

REFERENCE SIGNS LIST

1 Planting container unit
2 Wall surface
3 Floor surface
100 Outer container of planting container unit
111 Upper-surface opening of outer container
112 Front-surface opening of outer container
113 Wall of front-surface opening of outer container
121 Water reservoir
122 Cylindrical through-hole
140 Top part of outer container
141 Notch
142 Tab at top part of outer container
161 Bottom flange of outer container
171 Engaging portion
181 Groove for irrigation pipe
182 Projecting portion
183 Receiving portion
200 Inner container of planting container unit
211 Front-surface opening of inner container
212 Upper-surface opening of inner container
213 Front-surface flange of inner container
231 Lattice-shaped structure
241 Tab on side surface of inner container
242 Hooked protrusion
300 Fixing plate of planting container unit
341 Bent portion
401 Planting base
402 Pot plant
500 Lid
601 Wall-mounting holder
602 Floor-mounting holder

The invention claimed is:

1. A planting container unit comprising:
an outer container having a first upper-surface opening and a first front-surface opening;
an inner container that is engaged by being inserted into the first front-surface opening; and
a fixing plate with which the inner container is fixed to the outer container, wherein:
the inner container is capable of housing a planting base and a pot plant, includes a second front-surface opening through which a plant body part of the pot plant is able to be exposed to an outside, and includes, separately from the second front-surface opening, a second upper-surface opening for housing the planting base and the pot plant;
on a front surface having the second front-surface opening, the inner container has a front-surface flange that extends across the front surface and engages with a wall of the outer container around the first front-surface opening, and the planting container unit is configured such that, by combining the front-surface flange and the fixing plate with each other, the inner container is removably housed inside the outer container while closing the first front-surface opening;
the outer container has at least one notch in the first front-surface opening, and at least one tab at a top part on a side of the first front-surface opening;
the inner container has a tab near the front-surface flange, on a side surface that is adjacent to the front-surface flange and inserted into the first front-surface opening, and hooked protrusions that are on outer sides of both side edges of the front-surface flange such that the fixing plate is insertable into the hooked protrusions;
the fixing plate has a Z-shaped cross-section as seen in a side view;
the tab is configured to pass through the notch when the inner container is inserted into the first front-surface opening of the outer container, and the wall of the first front-surface opening constituting a part under the notch of the outer container is held between the tab and the front-surface flange; and
when the fixing plate is inserted into the hooked protrusions of the inner container, a bent portion of the fixing plate is fixed to an upper edge of the front-surface flange of the inner container, and an upper edge of the fixing plate is engaged with the tab at a top part of the outer container.

2. The planting container unit according to claim 1, wherein
the outer container has a water reservoir at a bottom part, and has, at a center of the bottom part, a cylindrical through-hole through which water overflowing from the water reservoir is released downward.

3. The planting container unit according to claim 1, wherein
the inner container has, at a bottom part, a lattice-shaped structure that supports the housed planting base and pot plant and guides irrigation water downward.

4. The planting container unit according to claim 1, wherein
the front-surface flange of the inner container and the fixing plate are combined with each other so as not to close the second front-surface opening.

5. The planting container unit according to claim 1, comprising:
a bottom flange that is parallel to a bottom surface in an outer periphery of a bottom part of the outer container, wherein,
when a plurality of container units is vertically disposed, the bottom part of the outer container of an upper container unit is inserted into the first upper-surface opening of the outer container of a lower container unit, and the second upper-surface opening of the outer container of the lower container unit is closed by the bottom part and the bottom flange of the outer container of the upper container unit.

6. The planting container unit according to claim 1, wherein
the outer container incudes, on a back surface side of a top part, an engaging portion for engaging the container unit with a wall-mounting holder that holds the container unit.

7. The planting container unit according to claim 1, wherein:
the outer container further includes a groove configured to allow an irrigation pipe for providing irrigation to be inserted; and
the groove includes a projecting portion on one side surface and a receiving portion into which the projecting portion is insertable on the other side surface.

8. The planting container unit according to claim 1, wherein
at least one of the outer container, the inner container, and the fixing plate is entirely composed of synthetic resin.

9. An assembly comprising:
a plurality of the planting container units according to claim 1 vertically disposed with respect to one another, and
a lid on an uppermost planting container unit of the plurality of planting container units.

10. The planting container unit according to claim 9, wherein
the lid is entirely composed of synthetic resin.

11. A greening method comprising
installing a plurality of planting container units according to claim 1 by arranging the planting container units at least vertically, and
selecting one of two options: arranging the outer containers independently and arranging the planting container units with a planting base and a pot plant housed in the inner container.

12. The greening method according to claim 11, wherein
the inner container housing the planting base and the pot plant is inserted into the outer container that has been independently arranged, and the inner container is fixed with the fixing plate.

13. The greening method according to claim 11, wherein
the fixing plate is removed from the arranged planting container unit in which the planting base and the pot plant are housed in the inner container to extract the inner container.

14. The greening method according to claim 11, wherein:
the fixing plate is removed from the arranged planting container unit in which the planting base and the pot plant are housed in the inner container, and the inner container is extracted from the outer container; and
a different inner container housing another planting base and another pot plant is inserted into the outer container and fixed with the fixing plate.

15. The greening method according to claim 11, wherein,
when installing a plurality of planting container units by arranging the planting container units vertically and horizontally,
a bottom part of an outer container of an upper planting container unit is inserted so as to close the first upper-surface opening of the outer container of a lower planting container unit; and
left and right planting container units are installed with a projecting portion of one of outer containers of the planting container units fitted into a receiving portion of the other one.

16. The greening method according to claim 11, wherein:
the outer container includes, on a back surface side of a top part, an engaging portion for engaging the planting container unit with a wall-mounting holder that holds the planting container unit; and
the container unit is held on the holder by engaging the engaging portion with the holder.

17. The greening method according to claim 16, wherein:
a floor-mounting holder that serves also for drainage is set on a floor near a wall surface; and
when a plurality of planting container units is vertically disposed, a lowermost planting container unit is supported by the floor-mounting holder that serves also for drainage.

* * * * *